UNITED STATES PATENT OFFICE.

ARTHUR LÜTTRINGHAUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

VAT DYE.

1,002,066.     Specification of Letters Patent.     Patented Aug. 29, 1911.

No Drawing.     Application filed February 18, 1911. Serial No. 609,342.

*To all whom it may concern:*

Be it known that I, ARTHUR LÜTTRINGHAUS, Ph. D., chemist, a subject of the King of Prussia, residing at Ludwigshafen-on-the-Rhine, Germany, have invented new and useful Improvements in Vat Dye, of which the following is a specification.

I have discovered a new vat coloring matter of the anthracene series which can be obtained by condensing 1-halogen-anthraquinon-2-carboxylic acid with para-chlor-anilin and then subjecting the product so obtained to a further condensing action, so that the elements of water are removed and ring formation takes place. The condensation can be effected, for instance, by means of concentrated sulfuric acid, or thionyl chlorid, or phosphorus pentachlorid.

My new coloring matter can be obtained, for example, as follows, but my invention is of course not confined to this example. The parts are by weight. Heat together for from two to three hours, at one hundred and sixty degrees centigrade, five and four-fifths parts of 1-chlor-anthraquinon-2-carboxylic acid, two and three-fifths parts of para-chlor-anilin, one-fifth part of copper powder, and from twenty-five to thirty parts of dimethyl-anilin. Then take up the carmin red melt with dilute hydrochloric acid and purify the 4'-chlor-1-anilido-anthraquinon-2-carboxylic acid by converting it into its sodium salt, isolating this and then re-converting it into the free acid. Then heat the free acid with ten times its weight of concentrated sulfuric acid for one hour at from ninety to one hundred degrees centigrade, whereby the greenish yellow solution gradually turns to an intense yellowish red. Then pour the sulfuric acid solution into ice and water and filter off and wash the coloring matter and purify it by extraction with boiling dilute sodium carbonate solution. The coloring matter contains chlorin and consists, when dry, of a carmin red powder which yields a red solution in hot amyl acetate, is insoluble in sixty-five per cent. sulfuric acid, but gives a reddish yellow solution in seventy per cent. sulfuric acid, and dyes cotton from the vat bluish red shades.

Now what I claim is:—

The new coloring matter of the anthracene series obtainable from 1-halogen-anthraquinon-2-carboxylic acid and para-chloranilin, which coloring matter is a monochlor-anthraquinon-acridon of a constitution corresponding to the formula

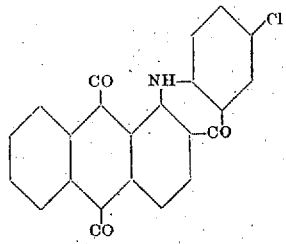

contains chlorin and consists, when dry, of a carmin red powder which yields a red solution in hot amyl acetate, is insoluble in sixty-five per cent. sulfuric acid, but gives a reddish yellow solution in seventy per cent. sulfuric acid, and dyes cotton from the vat bluish red shades.

In testimony whereof I have hereunto set my hand in the presence of two subscribing witnesses.

ARTHUR LÜTTRINGHAUS.

Witnesses:
J. ALEC. LLOYD,
A. O. TITTMANN.